(12) United States Patent
Mudegowdar

(10) Patent No.: US 10,771,723 B2
(45) Date of Patent: Sep. 8, 2020

(54) SYSTEMS AND METHODS FOR VOLTAGE SETTLING

(71) Applicant: SEMICONDUCTOR COMPONENTS INDUSTRIES, LLC, Phoenix, AZ (US)

(72) Inventor: Ishwar Chandra Mudegowdar, Antwerp (BE)

(73) Assignee: SEMICONDUCTOR COMPONENTS INDUSTRIES, LLC, Phoeniz, AZ (US)

( * ) Notice: Subject to any disclaimer, the term of this patent is extended or adjusted under 35 U.S.C. 154(b) by 25 days.

(21) Appl. No.: 16/181,767

(22) Filed: Nov. 6, 2018

(65) Prior Publication Data

US 2020/0145596 A1    May 7, 2020

(51) Int. Cl.
*H04N 5/378* (2011.01)
*H04N 5/376* (2011.01)

(52) U.S. Cl.
CPC ............. *H04N 5/378* (2013.01); *H04N 5/376* (2013.01)

(58) Field of Classification Search
None
See application file for complete search history.

(56) References Cited

U.S. PATENT DOCUMENTS

| | | | |
|---|---|---|---|
| 7,068,098 B1* | 6/2006 | Bell | H03F 1/42 327/309 |
| 8,537,254 B2* | 9/2013 | Miyashita | H04N 5/361 348/222.1 |
| 2007/0241258 A1 | 10/2007 | Altice | |
| 2008/0007638 A1* | 1/2008 | Aoki | H04N 5/23245 348/294 |
| 2008/0054164 A1 | 3/2008 | Johansson | |
| 2009/0021623 A1* | 1/2009 | Cho | H04N 5/335 348/308 |
| 2009/0303340 A1* | 12/2009 | Itano | H04N 5/3651 348/222.1 |
| 2010/0314530 A1* | 12/2010 | Hiyama | H04N 5/3651 250/208.1 |
| 2014/0036114 A1* | 2/2014 | Yoneda | H04N 5/361 348/247 |
| 2015/0249797 A1* | 9/2015 | Yui | H04N 5/3575 250/208.1 |

* cited by examiner

*Primary Examiner* — James M Hannett
(74) *Attorney, Agent, or Firm* — Treyz Law Group, P.C.; Tianyi He

(57) ABSTRACT

An image sensor pixel may include a photodiode, a floating diffusion, and a transfer gate. Column readout circuitry coupled to the image sensor pixel via a column line. Voltage settling circuitry may be coupled to the column line. Voltage settling circuitry may include a pre-charging circuit, a reset voltage slew boosting circuit, and an image signal voltage slew boosting circuit. The pre-charging circuit may pull down the column line voltage to a grounding voltage. The reset voltage slew boosting circuit may pull up the column line voltage to a reference voltage near a reset level voltage. The image signal voltage slew boosting circuit may pull down the column line voltage to an additional reference voltage near an image signal voltage. With the use of the voltage settling circuitry, a faster pre-charge and clamping of the column line can be achieved.

20 Claims, 7 Drawing Sheets

SYSTEMS AND METHODS FOR VOLTAGE SETTLING

BACKGROUND

This relates generally to imaging devices, and more particularly, to signal line voltage settling in imaging devices.

Image sensors are commonly used in electronic devices such as cellular telephones, cameras, and computers to capture images. In a typical arrangement, an electronic device is provided with an array of image pixels arranged in pixel rows and pixel columns. The image pixels contain a photodiode for generating charge in response to light (e.g., by photoelectric conversion). Circuitry is commonly coupled to each pixel column for reading out image signals from the image pixels using a corresponding column line.

In general, the column line voltage needs to settle to either a signal voltage or a reset voltage before sampling of the column line should occur. However, there is usually a long delay to do so as the drive strength of a corresponding pixel source follower transistor is limited. Because sampling an unsettled voltage on the column line will result in image artifacts, to avoid the image artifacts, image sensor operations will be significantly delayed.

It would therefore be desirable to provide imaging systems with improved column line voltage settling.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
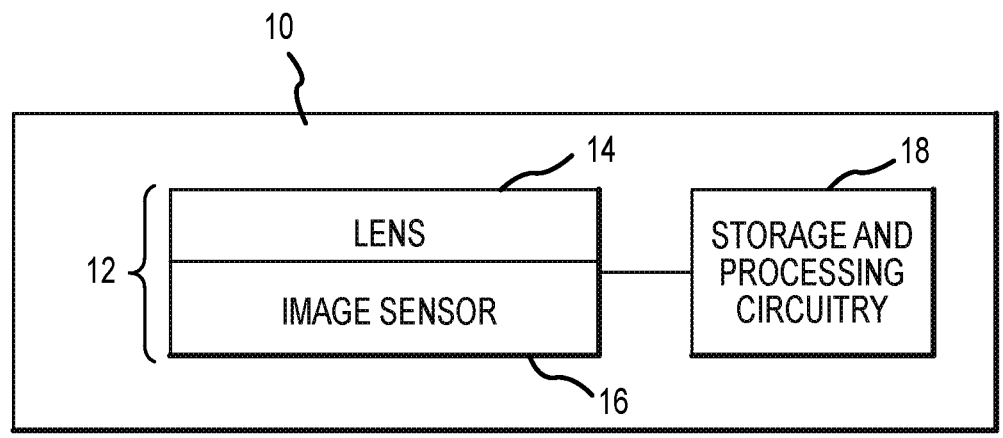
FIG. 1 is a diagram of an illustrative electronic device having an image sensor and processing circuitry for capturing images using a pixel array in accordance with some embodiments.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
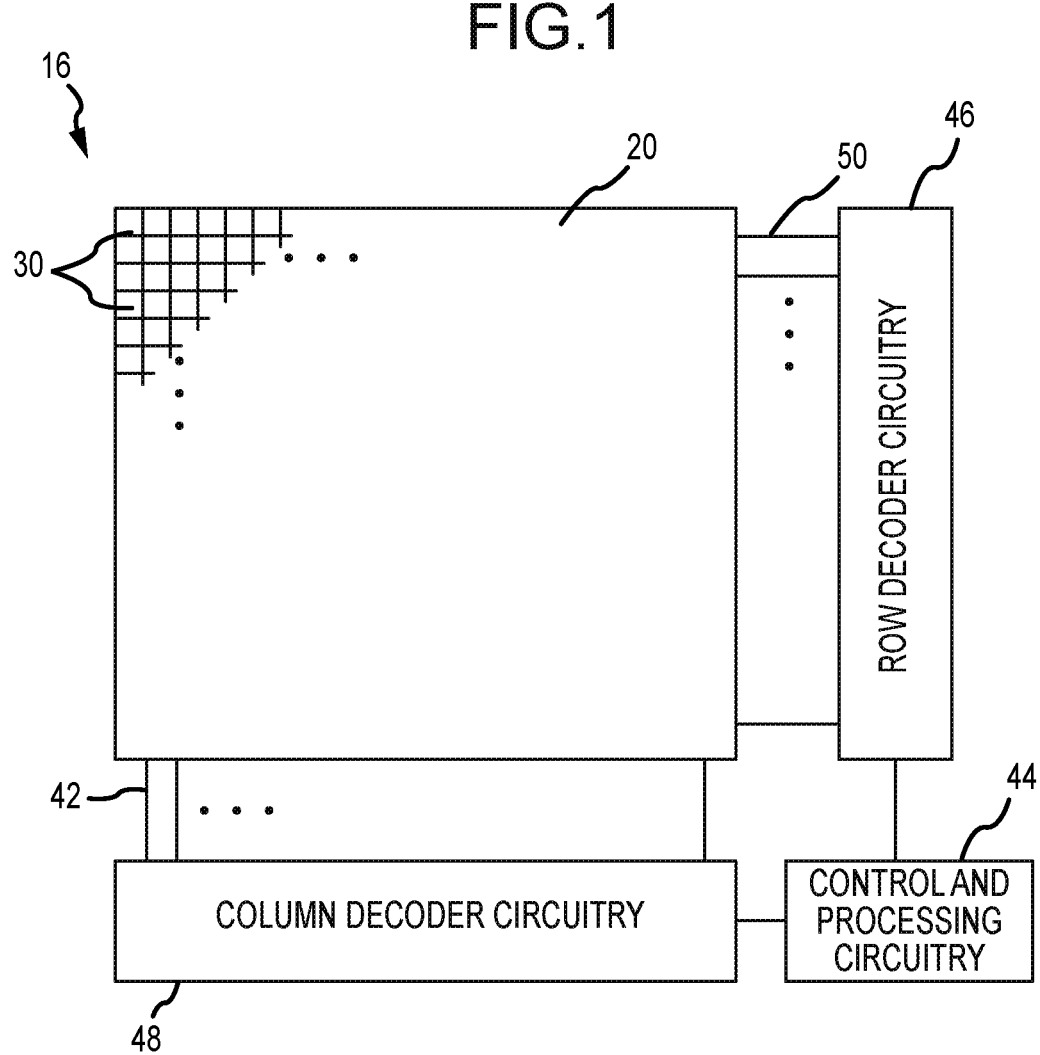
FIG. 2 is a diagram of an illustrative pixel array and associated readout circuitry for reading out image signals from the pixel array in accordance with some embodiments.

As shown in FIG. 2, image sensor 16 may include a pixel array 20 containing image sensor pixels 30 (sometimes referred to herein as image pixels or pixels) arranged in rows and columns and control and processing circuitry 44 (which may include, for example, image signal processing circuitry). Array 20 may contain, for example, hundreds or thousands of rows and columns of image sensor pixels 30. Control circuitry 44 may be coupled to row control circuitry 46 (sometimes referred to herein as row decoder circuitry or row circuitry) and column readout circuitry 48 (sometimes referred to herein as column control circuitry, readout circuitry, processing circuitry, or column decoder circuitry). Row control circuitry 46 may receive row addresses from control circuitry 44 and supply corresponding row control signals such as reset, row-select, charge transfer, dual conversion gain, and readout control signals to pixels 30 over row control lines 50. One or more conductive lines such as column lines 42 may be coupled to each column of pixels 30 in array 20. Column lines 42 may be used for reading out image signals from pixels 30 and for supplying bias signals (e.g., bias currents or bias voltages) to pixels 30. If desired, during pixel readout operations, a pixel row in array 20 may be selected using row control circuitry 46 and image signals generated by image pixels 30 in that pixel row can be read out along column lines 42.

Image readout circuitry 48 may receive image signals (e.g., analog pixel values generated by pixels 30) over column lines 42. Image readout circuitry 48 may include sample and hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 30 and for reading out image signals from pixels 30. ADC circuitry in readout circuitry 48 may convert analog pixel values received from array 20 into corresponding digital pixel values (sometimes referred to as digital image data or digital pixel data). Image readout circuitry 48 may supply digital pixel data to control and processing circuitry 44 and/or processor 18 (FIG. 1) for pixels in one or more pixel columns.

If desired, a color filter array may be formed over photosensitive regions in array 20 so that a desired color filter element in the color filter array is formed over an upper surface of the photosensitive region of an associated pixel 30. A microlens may be formed over an upper surface of the color filter array to focus incoming light onto the photosensitive region associated with that pixel 30. Incoming light may be focused onto the photosensitive region by the microlens and may pass through the color filter element so that only light of a corresponding color is captured at the photosensitive region. If desired, an optional masking layer may be interposed between the color filter element and the microlens for one or more pixels 30 in array 20. In another suitable arrangement, an optional masking layer may be interposed between the color filter element and the photosensitive region for one or more pixels 30 in array 20. The masking layers may include metal masking layers or other filtering layers that block a portion of the image light from being received at the photosensitive region. If desired, image pixels 30 may be formed without any masking layers.

If desired, pixels 30 in array 20 of FIG. 2 may be provided with an array of color filter elements that each pass one or more colors of light. All or some of pixels 30 may be provided with a color filter element. Color filter elements for pixels 30 may be red color filter elements (e.g., photoresist material that passes red light while reflecting and/or absorbing other colors of light), blue color filter elements (e.g., photoresist material that passes blue light while reflecting and/or absorbing other colors of light), and/or green color filter elements (e.g., photoresist material that passes green light while reflecting and/or absorbing other colors of light). Color filter elements may also be configured to filter light that is outside the visible human spectrum. For example, color filter elements may only allow infrared light or ultraviolet light to reach the photodiode. Color filter elements may configure image pixel 30 to only detect light of a certain wavelength or range of wavelengths and may be configured to allow multiple wavelengths of light to pass while blocking light of certain other wavelengths (for example, light having a wavelength that corresponds to a certain visible color and/or an infrared or ultraviolet wavelength).

Color filter elements that pass two or more colors of light (e.g., two or more colors of light selected from the group that includes red light, blue light, and green light) are sometimes referred to herein as "broadband" filter elements. For example, yellow color filter elements that are configured to pass red and green light and clear color filter elements that are configured to pass red, green, and blue light may be referred to herein as broadband filter elements or broadband color filter elements. Similarly, image pixels that include a broadband color filter element (e.g., a yellow, magenta, or clear color filter element) and that are therefore sensitive to two or more colors of light (e.g., that capture image signals in response to detecting two or more colors of light selected from the group that includes red light, blue light, and green light) may sometimes be referred to herein as broadband pixels or broadband image pixels.

As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. These examples are merely illustrative and, in desired, color filter elements of any suitable color and in any suitable pattern may be formed over any suitable number of image pixels 30.

Figure 3:
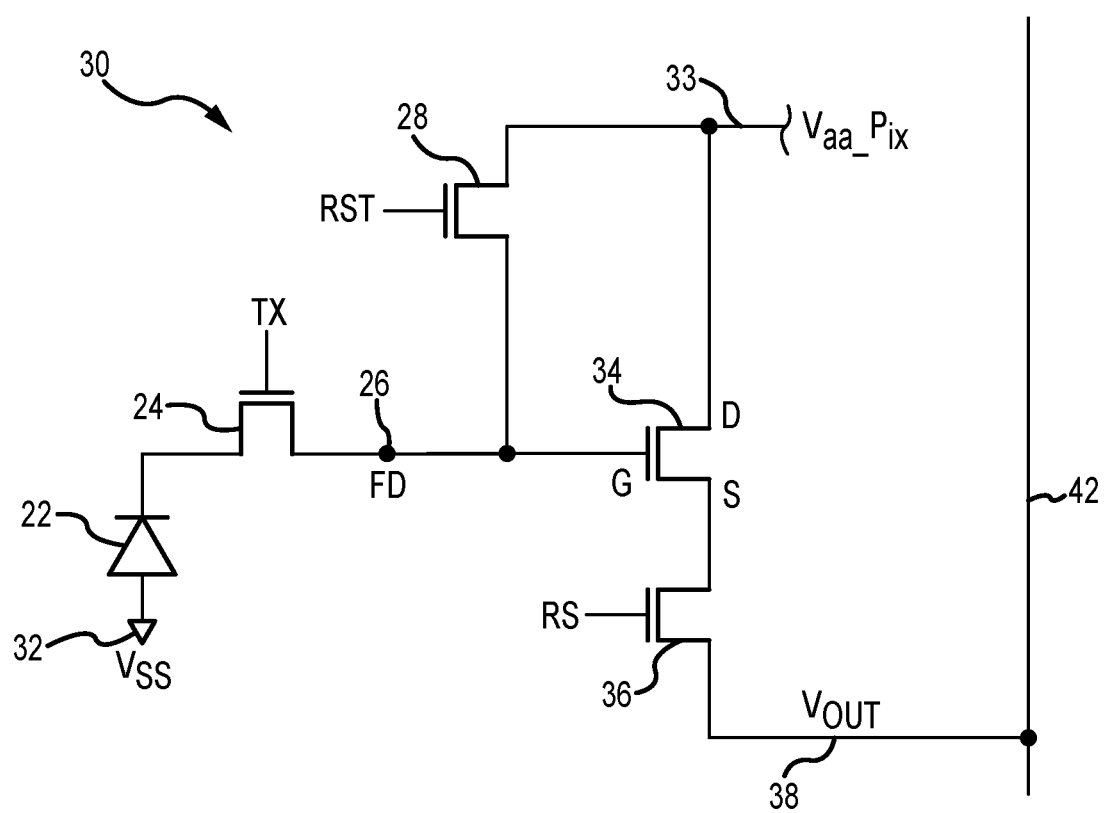
FIG. 3 is a schematic diagram of an illustrative image sensor pixel in accordance with some embodiments.

Circuitry in an illustrative image pixel 30 of image pixel array 20 is shown in FIG. 3. As shown in FIG. 3, pixel 30 may include a photosensitive element such as photodiode 22 (sometimes referred to herein as photodetector 22). A positive pixel power supply voltage (e.g., voltage Vaa_pix) may be supplied at positive power supply terminal 33. A ground power supply voltage (e.g., $V_{SS}$) may be supplied at ground power supply terminal 32. Incoming light may be gathered by photodiode 22 after passing through a color filter structure. Photodiode 22 may convert the light to electrical charge. Photodiode 22 may be reset to a reset voltage (e.g., a positive power supply voltage) before image acquisition.

Additionally, before an image is acquired, reset control signal RST may be asserted (e.g., asserted-high to activate a corresponding transistor). This turns on reset transistor 28 and resets charge storage node 26 (also referred to as floating diffusion FD or floating diffusion region FD) to a reset voltage level (e.g., a voltage level equal or close to voltage level Vaa_pix). The reset control signal RST may then be deasserted (e.g., asserted-low to deactivate a corresponding transistor) to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) may exhibit a capacitance that can be used to store the charge that has been transferred from photodiode 22. The signal associated with the stored charge on node 26 may be buffered by source-follower transistor 34. Row select transistor 36 may connect the source follower transistor 34 to column output line 42.

If desired, other types of image pixel circuitry may be used to implement the image pixels of image sensor 16. For example, each image sensor pixel 30 (see, e.g., FIG. 1) may be a three-transistor pixel, a pinned-photodiode pixel with four transistors, a global shutter pixel, a rolling shutter pixel, a pixel with light-flickering mitigation capabilities and/or charge overflow capabilities, etc. The circuitry of FIG. 3 is merely illustrative.

When it is desired to read out the value of the stored charge (i.e., the value of the stored charge that is represented by the signal at the source S of transistor 34), row select control signal RS can be asserted. When control signal RS is asserted, transistor 36 is turned on and a corresponding signal Vout that is representative of the magnitude of the charge on charge storage node 26 is produced on output path 38. There may be numerous rows and columns of pixels such as pixel 30 in the image sensor pixel array of a given image sensor. A conductive path such as column line 42 may be associated with one column of image pixels 30. When control signal RS is asserted in a given pixel 30, column line 42 can be used to route signal Vout from the pixel 30 to readout circuitry (e.g., readout circuitry 48 in FIG. 2).

Figure 4:
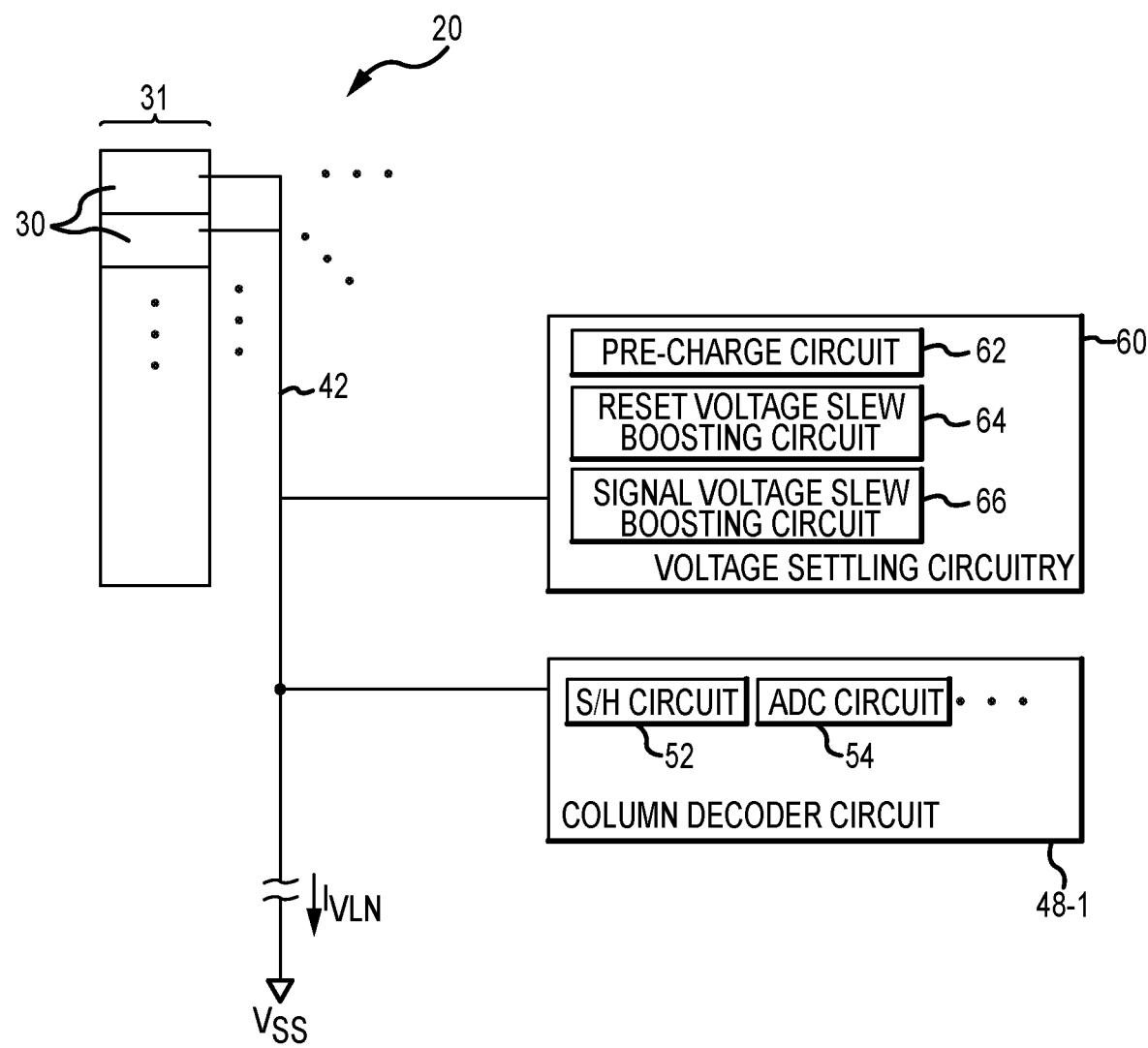
FIG. 4 is a block diagram of illustrative voltage settling circuitry coupled to a column line in accordance with some embodiments.

Because there may be a voltage settling delay in translating the actual voltage onto column line 42, it be desirable to accelerate the process with voltage settling circuitry. FIG. 4 shows voltage settling circuitry 60 (sometimes referred to herein as slew boosting circuitry or clamping circuitry) coupled to column line 42. In particular, pixel array 20 may include a column of pixels 30 (e.g., pixel column 31). Pixels 30 in column 31 are coupled to voltage settling circuitry 60 column decoder circuit 48-1 (sometimes referred to herein as a column readout circuit) via shared pixel output line 42. Column decoder circuit 48-1 may form a portion of column decoder circuitry 48 in FIG. 2. As an example, each column in pixel array 20 may be coupled to analogous voltage settling circuitry 60 and column decoder circuit 48-1. In other words, voltage settling circuitry 60 and column decoder circuit 48-1 may be provided on a per-column basis. This is merely illustrative. If desired, a single readout circuit 48-1 and/or a portion of voltage settling circuitry 60 may be shared by multiple columns in array 20 (e.g., circuit 48-1 and or a portion of voltage settling circuitry 60 may be shared by two columns of pixels 30, may be shared by three or more columns of pixels 30, etc.). If desired, only a portion of pixels 30 in column 31 (e.g., one pixel, two pixels, three or more pixels, etc.) may be coupled to (e.g., share) column decoder circuit 48-1 and/or voltage settling circuitry 60.

As shown in FIG. 4, column decoder circuit 48-1 may include sample and hold circuit 52 (i.e., S/H circuit 52) used to sample and store voltages on column line 42. Column decoder circuit 48-1 may include analog-to-digital conversion circuit 54 (i.e., ADC circuit 54) that coverts an analog signal gathered by sample and hold circuit 52 to a digital signal. Column decoder circuit 48-1 may also include other circuits such as those described in connection with column decoder circuitry 48 in FIG. 2.

Voltage settling circuitry 60 may include pre-charge circuit 62 that pulls down the voltage on column line 42 to a first reference voltage after each sampling of a corresponding image signal voltage. This helps to eliminate any dependency of a subsequent sampling from a prior sampling (e.g., from residual charge on column line 42). Voltage settling circuitry 60 may include reset voltage slew boosting circuitry 64 that pulls up the voltage on column line 42 to a second reference voltage close to a reset voltage (e.g., a second reference voltage level that is within 5%, 10%, 20%, etc. of the reset voltage level). This helps accelerate the settling process from the first reference voltage to the reset voltage (sometimes referred to herein as a pixel reset voltage or reset level voltage). Voltage settling circuitry 60 may include (pixel image) signal voltage slew boosting circuitry 66 that pulls down the voltage on column line 42 to a third reference voltage close to an image signal voltage (e.g., an average image signal voltage, an expected image signal voltage). This helps accelerate the settling process from the reset voltage to an image signal voltage (sometimes referred to herein as a pixel signal voltage).

Figure 5:
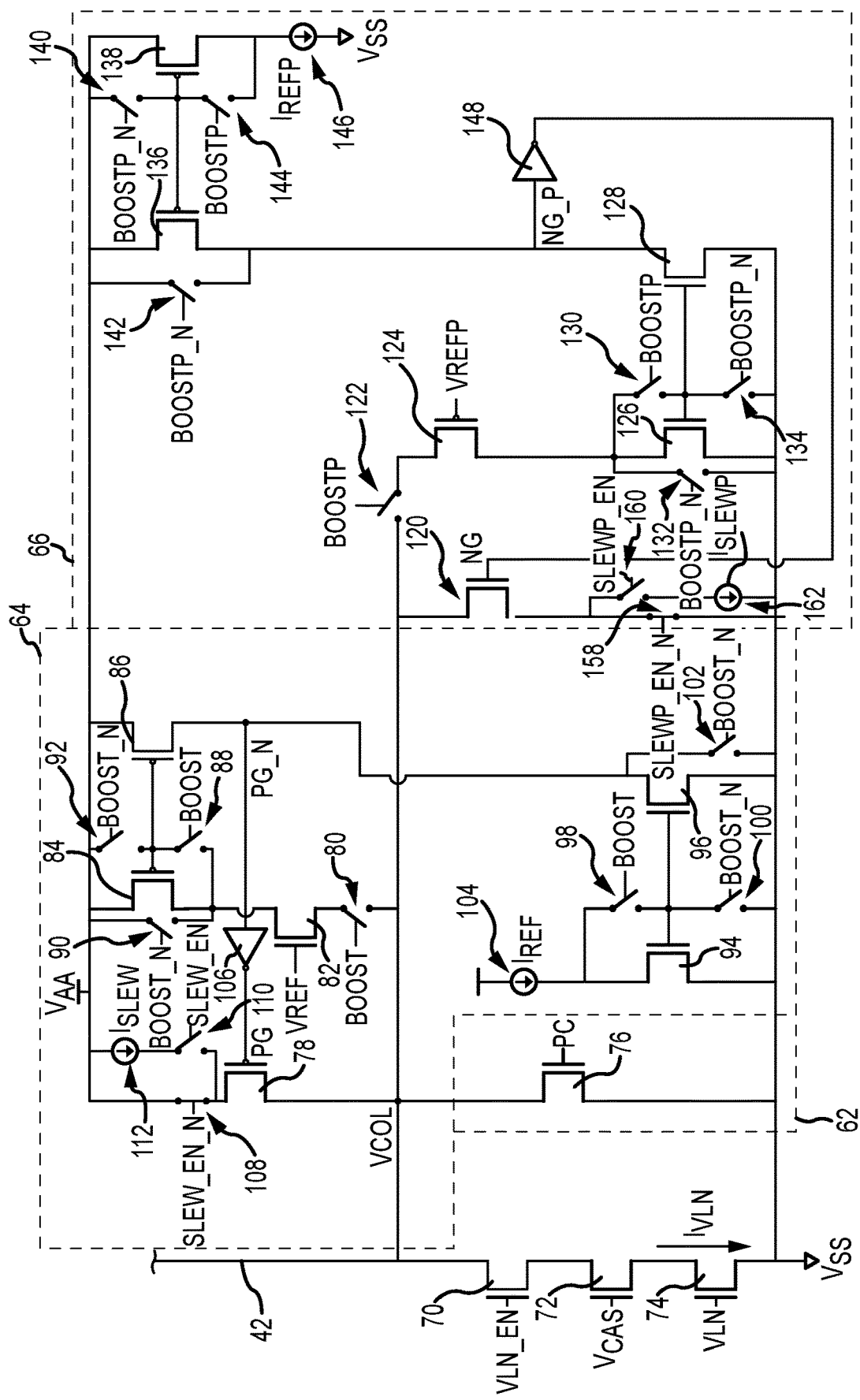
FIG. 5 is a schematic diagram of illustrative voltage settling circuitry such as the voltage settling circuitry shown in FIG. 4 in accordance with some embodiments.

FIG. 5 shows a schematic diagram of illustrative voltage settling circuitry that may be used to implement voltage settling circuitry 60 in FIG. 4. Column decoder circuit 48-1 shown in FIG. 4 has been omitted from FIG. 5 for the sake of clarity. As shown in FIG. 5, column line 42 may be coupled to a grounding terminal having voltage $V_{SS}$ through transistor 70, 72, and 74. Transistors 70, 72, and 74 may activate and drive current on column line 42.

A pre-charge portion of voltage settling circuitry 60 (e.g., pre-charge circuit 62) may include (NMOS) pre-charge transistor 76 (sometimes referred to herein as a pull-down transistor). Transistor 76 may be coupled between the column line 42 and a grounding terminal or a first reference voltage. In particular, transistor 76 may be in parallel with transistors 70, 72, and 74 (e.g., may have a first source-drain terminal coupled to column line 42 and a second-source drain terminal coupled to a grounding terminal having voltage $V_{SS}$). For clarification, a source-drain terminal of a transistor may refer to either a source terminal or a drain terminal of a transistor depending on a type of the transistor. When activated by an asserted control signal PC received at a gate terminal of transistor 76, transistor 76 may electrically connect column line 42 to a grounding terminal thereby pulling column line voltage VCOL down to grounding voltage $V_{SS}$.

A reset voltage slew boosting portion of voltage settling circuitry 60 (e.g., reset voltage slew boosting circuitry 64) may include transistor 78 (sometimes referred to herein as a pull-up transistor). Transistor 78 may be a PMOS transistor that receives control signal PG at a gate terminal of transistor 78. Transistor 78 may have a first source-drain terminal coupled to column line 42 and a second-source drain terminal coupled to a voltage supply terminal having voltage $V_{AA}$. Control signal PG may be generated based on states of switches 80, 88, 90, 92, 98, 100, and 102.

Control signal BOOST may control the state of switches 80, 88, 98. An inverted version of control signal BOOST (i.e., control signal BOOST_N) may control switches 90, 92, 100, and 102. For example, when control signal BOOST is asserted, switches 80, 88, and 98 may be closed (e.g., placed in an activated or conductive state) and switches 90, 92, 100, and 102 may be open (e.g., placed in a deactivated or nonconductive state). Reset voltage slew boosting circuit 64 may be enabled or activated when control signal BOOST is asserted.

In particular, switch 80 may connect (NMOS) transistor 82 to column line 42. Transistor 82 may be coupled to a current mirroring circuit. The current mirroring circuit may include (PMOS) transistors 84 and 86. Transistors 84 and 86 may have respective gate terminals coupled to each other and coupled to a source-drain terminal of transistor 84 and a source-drain terminal of transistor 82 through switch 88. In this configuration, a current present between transistors 82 and 84 is mirrored onto the path coupling transistor 86 to inverter 106.

Reset voltage slew boosting circuit 64 may include an additional current mirroring circuit. The additional current mirroring circuit includes (NMOS) transistors 94 and 96. Similar to transistors 84 and 86, transistors 94 and 96 may have respective gate terminals coupled to each other and coupled to a source-drain terminal of transistor 94 and current source 104 through switch 98. Current $I_{REF}$ generated by current source 104 may therefore be mirrored onto the path coupling transistor 96 to inverter 106.

Since the mirrored current across transistor 86 flows in a direction from a supply voltage terminal to inverter 106 and the mirrored current across transistor 96 flows in a direction from inverter 106 to a grounding voltage terminal, the magnitude of the two mirrored currents will determine whether signal PG_N received at inverter 106 will be high or low. As an example, after pre-charging of column line 42 occurs, column line voltage VCOL will be at or near grounding voltage $V_{SS}$. In this scenario, the current to transistor 84 (e.g., the current across transistor 82 towards transistor 84) may be larger than current $I_{REF}$ from current source 104. As such, the mirrored current across transistor 86 may similarly be larger than the current across transistor 96. Signal PG_N may therefore be pulled up or at a logic high to generate a logic low signal PG using inverter 106. When transistor 78 is asserted (e.g., when PMOS transistor 78 receives a control signal at a logic low), column line 42 may be connected with the supply voltage terminal, and column line voltage VCOL may be pulled up towards supply voltage $V_{AA}$.

As another example, after being pulled up towards supply voltage $V_{AA}$, when column line voltage VCOL approaches a reference voltage associated with transistor 82 (e.g., a gate-threshold differential voltage of transistor 82 referred to herein as voltage VREF for clarity since voltage VREF may be adjusted to achieve any suitable gate-threshold differential voltage), the current across transistor 82 may decrease to be less than current $I_{REF}$ generated by current source 104. As such, the mirrored current across transistor 86 may similarly be less than the current across transistor 96. Signal PG_N may therefore be pulled down or at a logic low to generate a logic high signal PG using inverter 106. When transistor 78 is deasserted (e.g., when PMOS transistor 78 receives a control signal at a logic high), column line 42 may be disconnected with the supply voltage terminal, and column line voltage VCOL may be disassociated with supply voltage $V_{AA}$.

As a result, reset voltage slew boosting circuit 64 is a self-regulating circuit or feedback circuit that pulls the column line voltage VCOL to a reference voltage (e.g., voltage VREF) and stops at or near the reference voltage even when control signal BOOST is asserted and reset voltage slew boosting circuit 64 remains activated. In other words, transistor 78 is controlled by a feedback loop that senses column line voltage VCOL. When the column line voltage is lower than a reference voltage, transistor 78 is turned on, and when the column line voltage is higher than the reference voltage, transistor 78 is turned off.

Additionally, reset voltage slew boosting circuit 64 may include switch 110 controlled by signal SLEW_EN and switch 108 controlled by an inverted version of signal SLEW_EN. In particular, switch 108 may couple a supply voltage terminal to a source-drain terminal of transistor 78. Switch 110 may couple current source 112 to the source-drain terminal of transistor 78. The supply voltage terminal or current source 112 may be used to perform pull-up functions. If desired, current source 112 supplying current $I_{SLEW}$ may be more suitably used when the supply voltage terminal is shared among many circuits and may be susceptible to large current draw, as an example.

Voltage settling circuitry 60 may also include an (image) signal voltage slew boosting portion (e.g., signal voltage slew boosting circuit 66). Signal voltage slew boosting circuit 66 may be complementary version of reset voltage slew boosting circuit 64. In particular, signal voltage slew boosting circuit 66 may include transistor 120 (sometimes referred to herein as a pull-down transistor). Transistor 120 may be an NMOS transistor that receives control signal NG at a gate terminal of transistor 120. Transistor 120 may have a first source-drain terminal coupled to column line 42 and a second-source drain terminal coupled to a grounding terminal having voltage $V_{SS}$. Control signal PG may be generated based on states of switches 122, 130, 132, 134, 140, 142, and 144.

Control signal BOOSTP may control the state of switches 122, 130, and 144. An inverted version of control signal BOOSTP (i.e., control signal BOOSTP_N) may control switches 132, 134, 140, and 142. For example, when control signal BOOSTP is asserted, switches 122, 130, and 144 may be closed and switches 132, 134, 140, and 142 may be open. Signal voltage slew boosting circuit 66 may be enabled or activated when control signal BOOSTP is asserted.

In particular, switch 122 may connect (PMOS) transistor 124 to column line 42. Transistor 124 may be coupled to a current mirroring circuit. The current mirroring circuit may include (NMOS) transistors 126 and 128. Transistors 126 and 128 may have respective gate terminals coupled to each other and coupled to a source-drain terminal of transistor 126 and a source-drain terminal of transistor 124 through switch 130. In this configuration, a current present between transistors 124 and 126 is mirrored onto the path coupling transistor 128 to inverter 148.

Signal voltage slew boosting circuit 66 may include an additional current mirroring circuit. The additional current mirroring circuit includes (PMOS) transistors 136 and 138. Similar to transistors 126 and 128, transistors 136 and 138 may have respective gate terminals coupled to each other and coupled to a source-drain terminal of transistor 138 and current source 146 through switch 144. Current $I_{REFP}$ generated by current source 144 may therefore be mirrored onto the path coupling transistor 136 to inverter 148.

Since the mirrored current across transistor 128 flows in a direction from inverter 148 towards a grounding voltage terminal, and the mirrored current across transistor 136 flows in a direction from a supply voltage terminal towards inverter 148, the magnitude of the two mirrored currents will determine whether signal NG_N received at inverter 148 will be high or low. As an example, after column line 42 has been reset, column line voltage VCOL will be at or near a reset voltage level (e.g., voltage $V_R$). In this scenario, the current across transistor 126 may be larger than current $I_{REFP}$ from current source 146. As such, the mirrored current across transistor 128 may similarly be larger than the current across transistor 136. Signal NG_N may therefore be pulled down or at a logic low to generate a logic high signal NG using inverter 148. When transistor 120 is asserted (e.g., when NMOS transistor 120 receives a control signal at a logic high), column line 42 may be connected with the grounding voltage terminal, and column line voltage VCOL may be pulled down towards grounding voltage $V_{SS}$.

As another example, after being pulled down towards grounding voltage $V_{SS}$, when column line voltage VCOL approaches a reference voltage associated with transistor 124 (e.g., a gate-threshold differential voltage of transistor 124 referred to herein as voltage VREFP for clarity since voltage VREFP may be adjusted to achieve any suitable gate-threshold differential voltage), the current across transistor 124 may decrease to be less than current $I_{REFP}$ generated by current source 146. As such, the mirrored current across transistor 128 may similarly be less than the current across transistor 136. Signal NG_N may therefore be pulled up or at a logic high to generate a logic low signal PG using inverter 148. When transistor 120 is deasserted (e.g., when NMOS transistor 120 receives a control signal at a logic low), column line 42 may be disconnected with the grounding voltage terminal, and column line voltage VCOL may be disassociated with supply voltage $V_{AA}$.

As a result, image signal voltage slew boosting circuit 66 is similarly a self-regulating circuit or feedback circuit that pulls the column line voltage VCOL to a reference voltage (e.g., voltage VREFP) and stops at or near the reference voltage even when control signal BOOSTP is asserted and signal voltage slew boosting circuit 66 remains activated. In other words, transistor 120 is controlled by a feedback loop that senses column line voltage VCOL. When the column line voltage is higher than a reference voltage, transistor 120 is turned on, and when the column line voltage is lower than the reference voltage, transistor 120 is turned off. Reset voltage slew boosting circuit 64 and signal voltage slew boosting circuit 66 may be activated at different times.

Additionally, signal voltage slew boosting circuit 66 may include switch 160 controlled by signal SLEWP_EN and switch 158 controlled by an inverted version of signal SLEWP_EN. In particular, switch 158 may couple a ground voltage terminal to a source-drain terminal of transistor 120. Switch 160 may couple current source 162 to the source-drain terminal of transistor 120. The supply voltage terminal or current source 162 may be used to perform pull-down functions. If desired, current source 162 supplying current $I_{LEWP}$ may be more suitably used when the ground voltage terminal is shared among many circuits and may be susceptible to large current draw, as an example.

By using voltage settling circuitry 60, which includes pre-charging, reset voltage slew boosting, and image signal slew boosting capabilities, readout speed may be improved and readout signal lag may be mitigated (e.g., prior readout charge may be purged form the column line), while also removing image artifacts associated with voltage settling. Additionally, the pull-down operation implemented by pre-charge circuit 62 enables the subsequent pull-up feedback loop to be activated quickly consistently.

The exemplary schematic of FIG. 5 is merely illustrative. If desired, one or more of pre-charging, and slew boosting portions may be omitted. As an example, signal voltage slew boosting circuit 66 may be omitted, if desired. If desired, pre-charge portion 62 may be implemented with current mirroring circuits as with slew boosting portions 64 and 66. If desired, the mirroring circuits in voltage settling circuitry 60 may be implemented with cascodes.

Additionally, while FIG. 5 shows transistor 74, which may be used to bias a source follower transistor and the column line, this is merely illustrative. In configurations without transistor 74, voltage VREF received by transistor 72 and/or current $I_{REF}$ generated by current source 104 may determine a clamping voltage for the column line. In other words, voltage settling circuitry 60 may clamp the column line to the clamping voltage in scenarios in which the source following transistor is not biased.

Figure 6:
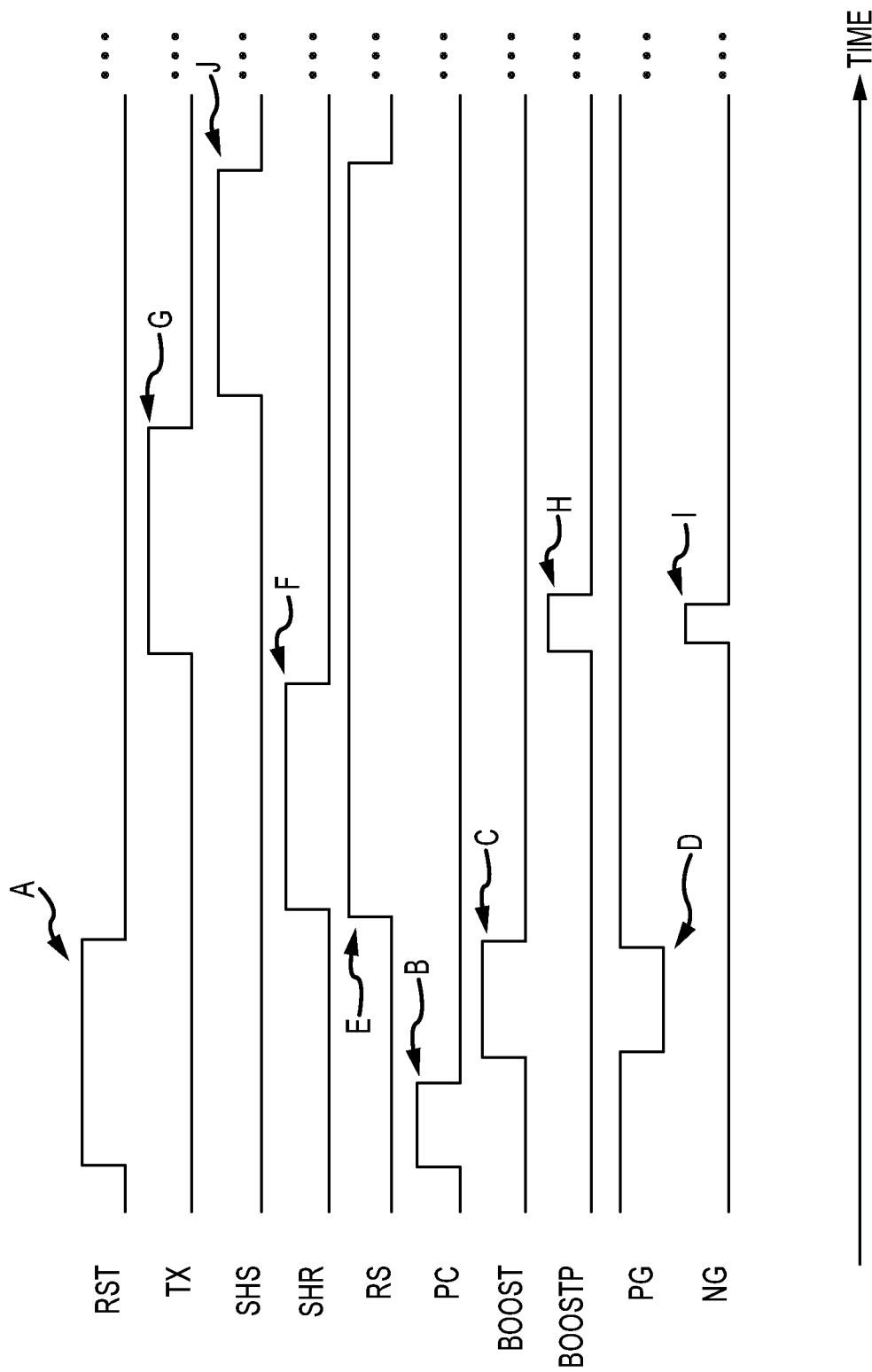
FIG. 6 is a timing diagram for operating illustrative voltage settling circuitry such as the voltage settling circuitry shown in FIG. 5 in accordance with some embodiments.

FIG. 6 shows a timing diagram for operating voltage settling circuitry such as voltage settling circuitry 60 in FIG. 5. In particular, timing regarding readout operations for a particular pixel such as pixel 30 in FIG. 3 coupled to voltage settling circuitry 60 in FIG. 5 is shown in FIG. 6.

To prepare for readout operations reset signal RST (in FIG. 3) may be asserted (e.g., assertion A) to active transistor 28 (in FIG. 3) and reset floating diffusion region 26 (in FIG. 3) to a reset level voltage. Before column line 42 (in FIG. 5) receives the reset level voltage, control signal PC may be asserted (e.g., assertion B) activate transistor 76 (in FIG. 5) to purge column line 42 of charge from a prior readout. Subsequently, control signal PC may be deasserted and control signal BOOST may be asserted to open and close corresponding switches in reset voltage slew boosting circuit 64 (in FIG. 5), thereby activating reset voltage slew boosting circuit 64. In response to asserting control signal BOOST, signal PG may be asserted (e.g., pulled down in assertion D), which activates transistor 78 ((in FIG. 5). After signal PG is deasserted (e.g., in a self-regulating manner), control signal BOOST may also be deasserted. When signal PG is deasserted, column line voltage VCOL may be at a reference level voltage near the reset level voltage, and column line 42 may be ready to receive the reset level voltage from a source follower transistor of pixel 30. Assertions B and C may occur simultaneously (e.g., at least partially overlap) with assertion A, if desired.

With assertion E, signal RS (in FIG. 3) may be asserted to select pixel 30 for readout. In particular, signal RST may be deasserted, and the reset level voltage stored at floating diffusion region 26 (in FIG. 3) may be translated onto column line 42 as a reset voltage. Because the reset voltage settling time is decreased by the use of reset voltage slew boosting circuit 64 (in FIG. 5), signal SHR may be asserted (e.g., assertion F) to sample the reset voltage after a short amount of time and still capture a desirable reset voltage.

With assertion G, signal TX may be asserted to activate transistor 24 (in FIG. 3) and transfer charge generated by photodiode 22 to floating diffusion region 26 (in FIG. 3). Before column line 42 (in FIG. 5) receives the image signal voltage, control signal BOOSTP may be asserted to open and close corresponding switches in image signal voltage slew boosting circuit 66 (in FIG. 5), thereby activating image signal voltage slew boosting circuit 66. in response to asserting control signal BOOSTP, signal NG may be asserted, which activates transistor 120 (in FIG. 5). After signal NG is deasserted (e.g., in a self-regulating manner), control signal BOOSTP may also be deasserted. When signal NG is deasserted, column line voltage VCOL may be at a reference level voltage near the image signal voltage, and column 42 may be ready to receive the image signal voltage from a source follower transistor of pixel 30. Assertion H may occur simultaneously (e.g., at least partially overlap) with assertion G.

Assertion E may persist through both reset voltage readout (e.g., assertion F) and image signal voltage readout (e.g., assertion J). In particular, signal Tx may be deasserted, and the image signal voltage stored at floating diffusion region 26 (in FIG. 3) may be translated onto column line 42 as an image signal voltage. Because the image signal voltage settling time is (on average) decreased by the use of signal voltage slew boosting circuit 66 (in FIG. 5), signal SHS may be asserted (e.g., assertion J) to sample the image signal voltage after a short amount of time and still capture a desirable image signal voltage.

Figure 7:
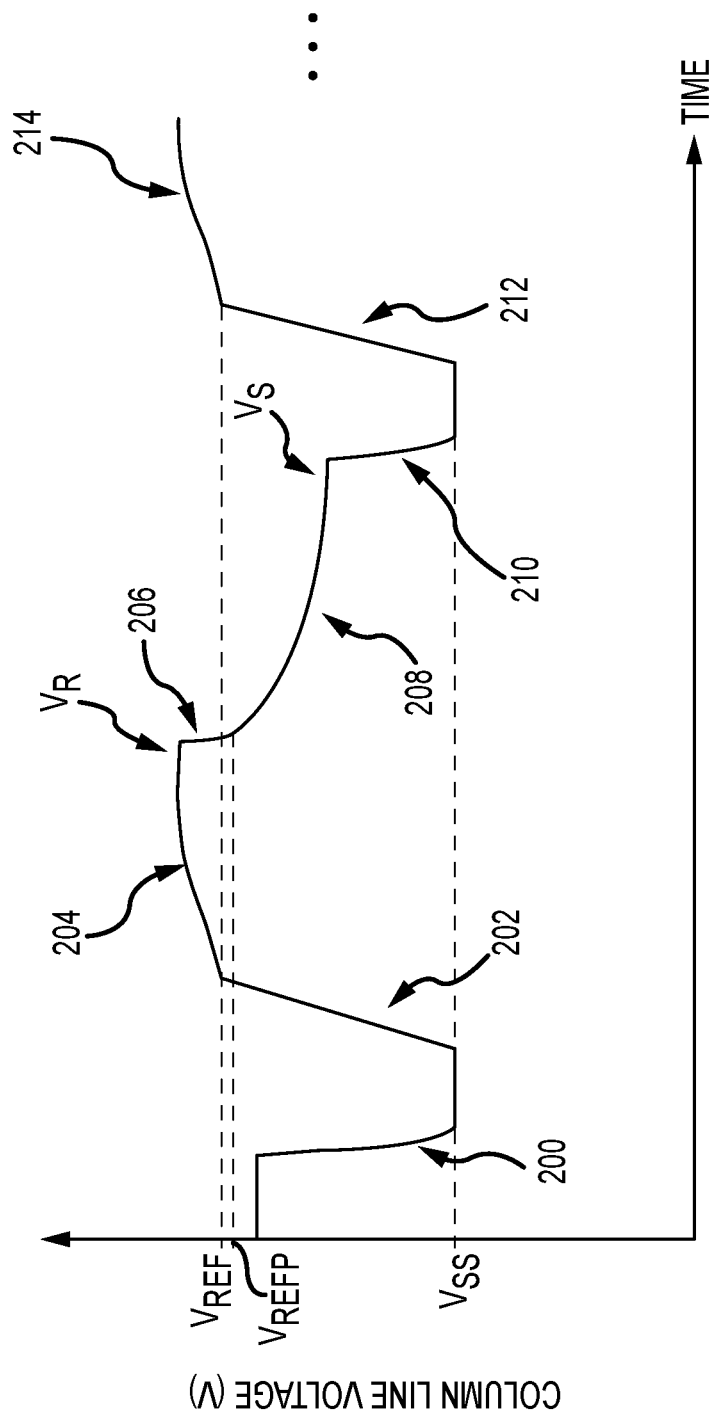
FIG. 7 is a graph plotting column line voltage versus time while operating voltage settling circuitry of the type shown in FIGS. 4-6 in accordance with some embodiments.

FIG. 7 show a graph of column line voltage (e.g., voltage VCOL) plotted against time while operating voltage settling circuitry such as voltage settling circuitry 60. In particular, column line voltage VCOL may begin at a voltage from a prior readout. During portion 200, column line voltage VCOL may be pulled down to a first reference voltage such as grounding voltage $V_{SS}$ by using pre-charge circuit 62 (in FIG. 5). During portion 202, column line voltage VCOL may be pulled up (in a linear manner) to a second reference voltage such as voltage VREF using reset voltage slew boosting circuit 64 (in FIG. 5). During portion 204, column line voltage VCOL may settle to actual reset voltage $V_R$. Although reset voltage $V_R$ is depicted as being higher than voltage $V_{REF}$, this is merely illustrative. In some scenarios, actual reset voltage $V_R$ may be lower than voltage $V_{REF}$ or may be any suitable voltage.

Subsequently, during portion 206, column line voltage VCOL may be pulled down to a third reference voltage such as voltage VREFP using image signal voltage slew boosting circuit 66 (in FIG. 6). During portion 208, column line voltage VCOL may settle to actual image signal voltage $V_S$. Although image signal $V_S$ is depicted as being lower than voltage $V_{REFP}$, this is merely illustrative. In some scenarios, actual image signal voltage $V_S$ may be higher than voltage $V_{REFP}$ or may be any suitable voltage. After portion 208, operation of voltage settling circuit 60 may repeat in portions 210, 212, and 214. If desired, voltage VREFP may be selected to be an average of possible output pixel values (e.g., output values across the dynamic range of the pixel). If desired, voltage VREFP may be selected to be closer to $V_R$ than to $V_S$.

Figure 8:
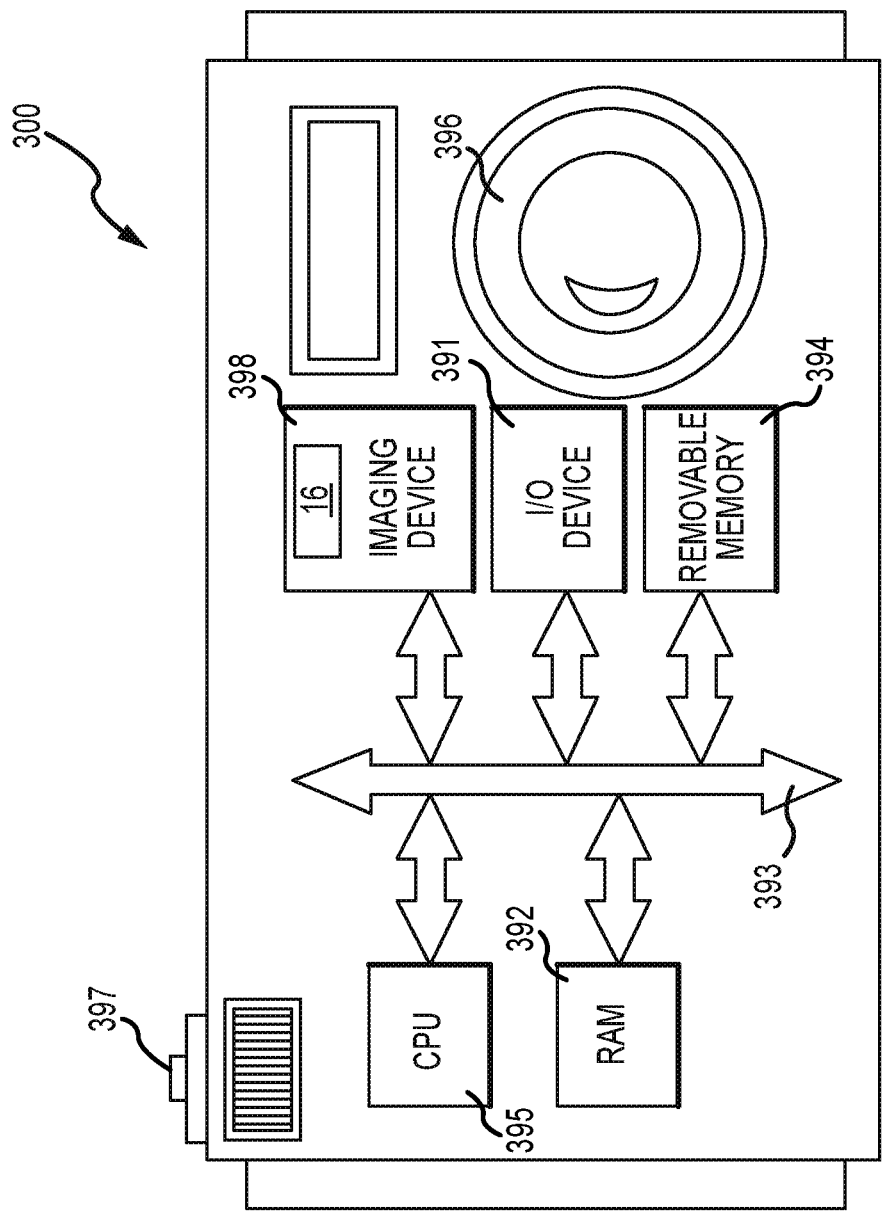
FIG. 8 is a block diagram of an illustrative image capture and processor system employing the embodiments of FIGS. 1-7 in accordance with some embodiments.

FIG. 8 shows in simplified form a typical image capture and processor system 300, such as a digital camera, which includes an imaging device 398 (e.g., an imaging device 398 such as image sensor 16 of FIGS. 1-7 employing pixels 30 coupled to voltage settling circuitry 60 and column readout circuitry 48). The processor system 300 is exemplary of a system having digital circuits that could include imaging device 398. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The image capture and processor system 300 generally includes a lens 396 for focusing an image on pixel array 20 of device 398 when a shutter release button 397 is pressed, central processing unit (CPU) 395, such as a microprocessor which controls camera and one or more image flow functions, which communicates with one or more input/output (I/O) devices 391 over a bus 393. Imaging device 398 also communicates with the CPU 395 over bus 393. The system 300 also includes random access memory (RAM) 392 and can include removable memory 394, such as flash memory, which also communicates with CPU 395 over the bus 393. Imaging device 398 may be combined with the CPU, with or without memory storage on a single integrated circuit or on a different chip. Although bus 393 is illustrated as a single bus, it may be one or more busses or bridges or other communication paths used to interconnect the system components.

The exemplary embodiments described in connection with FIGS. 4-8 are merely illustrative. If desired, voltage settling circuitry may be implemented in various locations within an image sensor or any other portion of an imaging system, or even any other electronics system. As an example, voltage settling circuitry may be implemented within analog-to-digital conversion circuitry or any other conversion circuitry to speed up the settling of voltage reference buffer amplifiers. Other examples may be voltage regulators that have voltage settling circuitry.

In various embodiments, an image sensor may include an array of image sensor pixels arranged in columns and rows. A column readout circuit may be coupled to each column of image sensor pixels via a respective column pixel output line (e.g., a signal line, a column line, or an output line). Voltage settling circuitry may be coupled to the output line. The voltage settling circuitry may include a pre-charge circuit (e.g., a pull-down circuit) that couples the output line to a first voltage terminal (e.g., a ground voltage terminal) that provides a first voltage level such as a ground voltage level. Voltage settling circuitry may also include a slew boosting circuit (e.g., a pull-up circuit) that couples the output line to a second voltage terminal (e.g., a supply voltage terminal) that provides a second voltage level such as a supply voltage level. The slew boosting circuit may be controlled using a feedback path based on a voltage of the output line (e.g., a feedback path directly coupled to the output line).

The slew boosting circuit may include a transistor that couples the output line to the second voltage terminal. The transistor may have a gate terminal that receives a control signal generated based on the voltage of the output line. The slew boosting circuit may further include a plurality of switches that are closed when the slew boosting circuit is activated by a boost control signal. The slew boosting circuit may also include an additional transistor coupled to the output line via a switch in the plurality of switches, and a current through the additional transistor may determine a state of the control signal.

The slew boosting circuit may include current mirroring circuit that receives the current through the additional transistor and generates a mirrored current and may include an additional current mirror circuit that receives a current from a current source and generates an additional mirrored current. The state of the control signal may be determined based on a difference between the mirrored current and the additional mirrored current. The current mirroring circuit may couple the gate terminal of the transistor to the additional transistor. The additional mirroring circuit may couple the gate terminal of the transistor to a current source.

The voltage settling circuit may also include an additional slew boosting circuit (e.g., an additional pull-down circuit) that couples the output line to the first voltage terminal. The additional slew boosting circuit may be controlled using an additional feedback path based on the voltage of the output line (e.g., a feedback path directly coupled to the output line).

The pre-charge circuit may include a first transistor that couples the output line to the first voltage terminal, the slew boosting circuit may include a second transistor that couples the output line to the second voltage terminal, and the additional slew boosting circuit may include a third transistor that couples the output line to the first voltage terminal. The slew boosting circuit operates independently from the additional slew boosting circuit.

In various embodiment, operating an image sensor that includes an image pixel coupled to readout circuitry using a column line may include activating a first transistor to couple the column line to a ground voltage terminal activating a second transistor to couple the column line to a supply voltage terminal, deactivating the second transistor based on a feedback path coupled directly to the column line after activating the second transistor, activating a third transistor to couple the column line to the ground voltage terminal after deactivating the second transistor, and deactivating the third transistor based on an additional feedback path coupled directly to the column line after activating the third transistor.

Before transferring a pixel reset level voltage from the image pixel to the column line, the first transistor may be activated to couple the column line to the ground voltage terminal. Before performing readout operations on the pixel reset level voltage, the second transistor may be activated to couple the column line to the supply voltage terminal. Before performing readout operations on the pixel reset level voltage, the second transistor may be deactivated based on the feedback path coupled directly to the column line.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor, comprising:
    an image sensor pixel;
    readout circuitry;
    an output line coupling the image sensor pixel to the readout circuitry; and
    voltage settling circuitry coupled to the output line, wherein the voltage settling circuitry comprises:
        a pre-charge circuit that couples the output line to a first voltage terminal that provides a first voltage level, and
        a slew boosting circuit that couples the output line to a second voltage terminal that provides a second voltage level and wherein the slew boosting circuit is controlled using a feedback path based on a voltage of the output line.

2. The image sensor defined in claim 1, wherein the first voltage level comprises a grounding voltage level and wherein the second voltage level comprises a power supply voltage level.

3. The image sensor defined in claim 2, wherein the slew boosting circuit comprises a transistor that couples the output line to the second voltage terminal and the transistor has a gate terminal that receives a control signal generated based on the voltage of the output line.

4. The image sensor defined in claim 3, wherein the slew boosting circuit comprises a plurality of switches that are closed when the slew boosting circuit is activated by a boost control signal.

5. The image sensor defined in claim 4, wherein the slew boosting circuit comprises an additional transistor coupled to the output line via a switch in the plurality of switches and wherein a current through the additional transistor determines a state of the control signal.

6. The image sensor defined in claim 5, wherein the slew boosting circuit comprises a current mirroring circuit that receives the current through the additional transistor and generates a mirrored current, and wherein the state of the control signal is determined based on the mirrored current.

7. The image sensor defined in claim 6, wherein the slew boosting circuit comprises an additional current mirror circuit that receives an additional current from a current source and generates an additional mirrored current, and wherein the state of the control signal is determined based on a difference between the mirrored current and the additional mirrored current.

8. The image sensor defined in claim 1, wherein the voltage settling circuit comprises an additional slew boosting circuit that couples the output line to the first voltage terminal.

9. The image sensor defined in claim 8, wherein the additional slew boosting circuit is controlled using an additional feedback path based on the voltage of the output line.

10. The image sensor defined in claim 8, wherein the pre-charge circuit comprises a first transistor that couples the output line to the first voltage terminal, wherein the slew boosting circuit comprises a second transistor that couples the output line to the second voltage terminal, and the additional slew boosting circuit comprises a third transistor that couples the output line to the first voltage terminal.

11. The image sensor defined in claim 8, wherein the slew boosting circuit operates independently from the additional slew boosting circuit.

12. A method of operating an image sensor that includes an image pixel coupled to readout circuitry using a column line, the method comprising:
    at voltage settling circuitry, activating a first transistor to couple the column line to a ground voltage terminal;
    at the voltage settling circuitry, activating a second transistor to couple the column line to a supply voltage terminal; and
    after activating the second transistor, deactivating the second transistor based on a feedback path coupled directly to the column line.

13. The method defined in claim 12, further comprising:
    at the voltage settling circuitry, activating a third transistor to couple the column line to the ground voltage terminal after deactivating the second transistor.

14. The method defined in claim 13, further comprising:
    after activating the third transistor, deactivating the third transistor based on an additional feedback path coupled directly to the column line.

15. The method defined in claim 12, wherein activating the first transistor comprises, before transferring a pixel reset level voltage from the image pixel to the column line, activating the first transistor to couple the column line to the ground voltage terminal.

16. The method defined in claim 15, wherein activating the second transistor comprises, before performing a readout operation on the pixel reset level voltage, activating the second transistor to couple the column line to the supply voltage terminal.

17. The method defined in claim 16, wherein deactivating the second transistor comprises, before performing the readout operation on the pixel reset level voltage, deactivating the second transistor based on the feedback path coupled directly to the column line.

18. Voltage settling circuitry, comprising:
    a signal line;
    a pull-down circuit having a first transistor that couples the signal line to a ground voltage terminal; and
    a pull-up circuit having second and third transistors, wherein the second transistor couples the signal line to a power supply voltage terminal, wherein the third transistor receives a reference voltage, and wherein a state of the second transistor is determined based on a difference between the reference voltage and a voltage on the signal line.

19. The voltage settling circuitry defined in claim 18, wherein the pull-up circuit comprises first and second current mirroring circuits, wherein the first current mirroring circuit couples the third transistor to a gate terminal of the second transistor, and wherein the second current mirroring circuit couples a current source to the gate terminal of the second transistor.

20. The voltage settling circuitry defined in claim 19, wherein the pull-down circuit comprises a fourth transistor that receives an additional reference voltage, wherein a state of the first transistor is determined based on a difference between the reference voltage and the voltage on the signal line, wherein the pull-down circuit further comprises third and fourth current mirroring circuits, wherein the third current mirroring circuit couples the fourth transistor to a gate terminal of the first transistor, and wherein the fourth current mirroring circuit couples an additional current source to the gate terminal of the first transistor.

* * * * *